July 5, 1938.  C. E. ROGERS  2,122,954
APPARATUS FOR STERILIZING LACTEAL LIQUIDS
Filed June 22, 1935   3 Sheets-Sheet 1
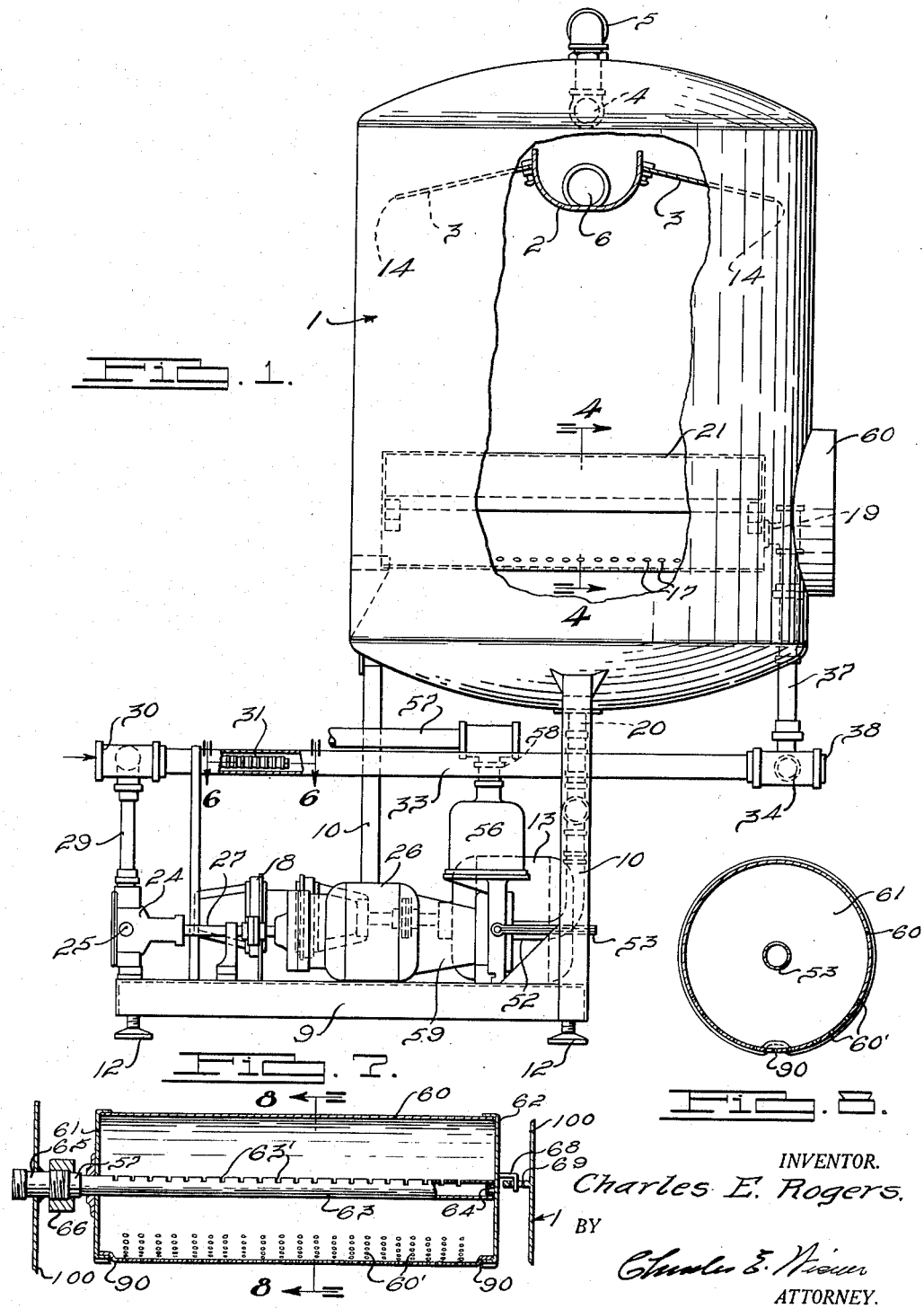
INVENTOR.
Charles E. Rogers.
BY
ATTORNEY.

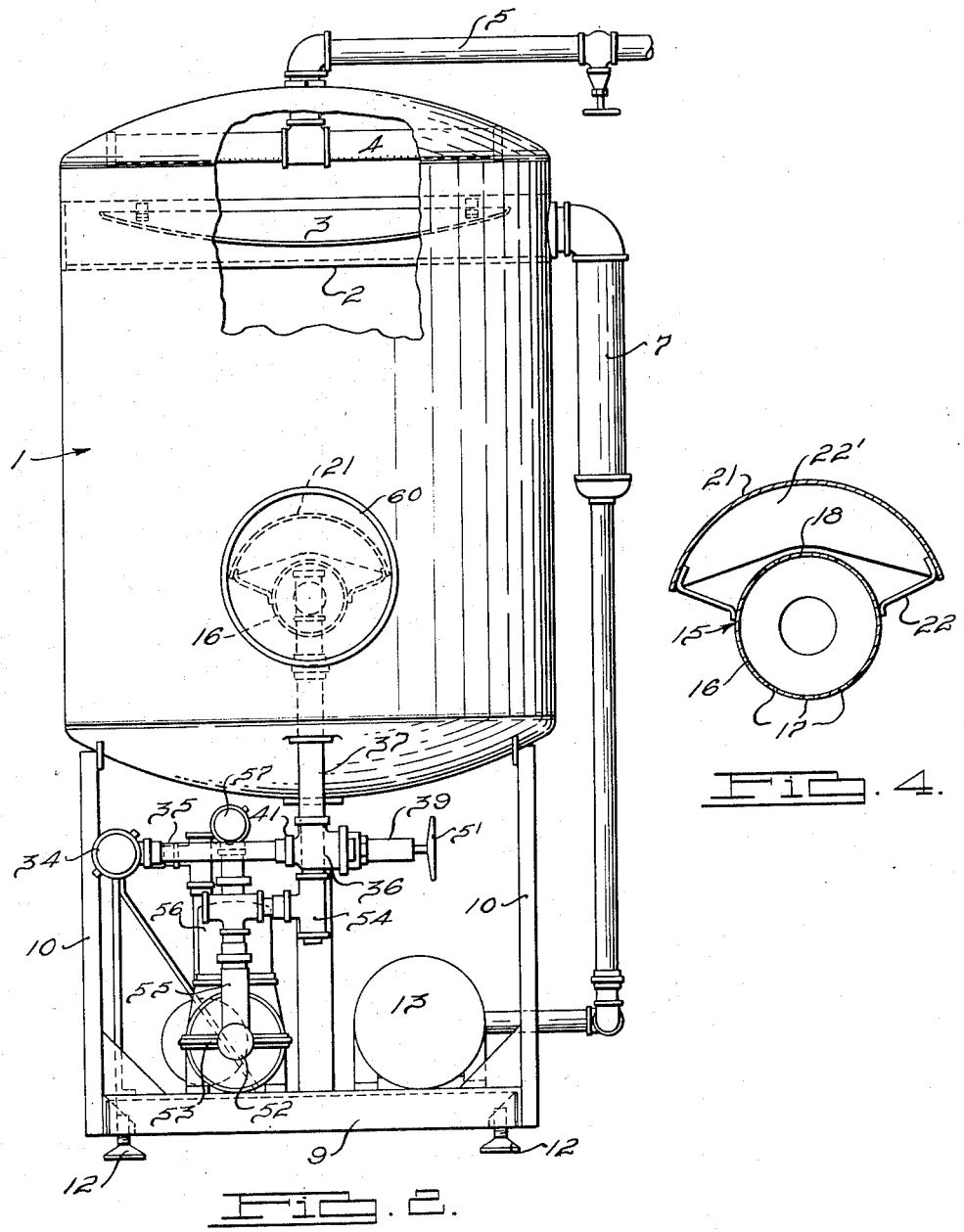

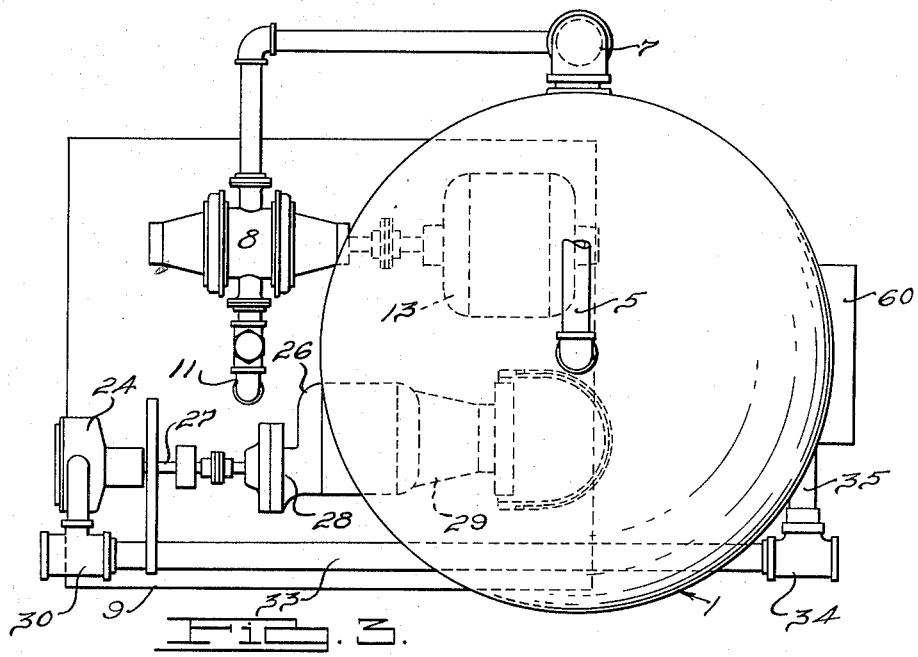
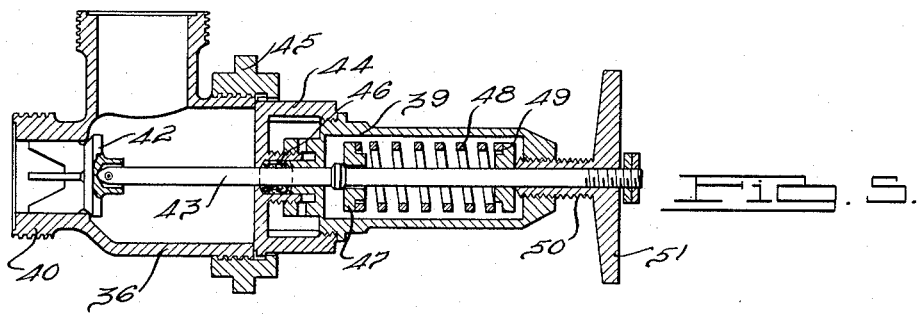
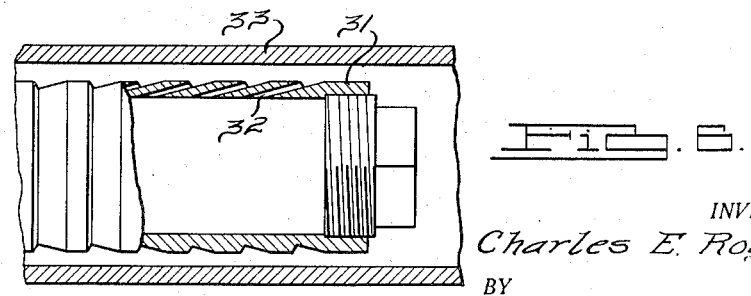

Patented July 5, 1938

2,122,954

UNITED STATES PATENT OFFICE 2,122,954

APPARATUS FOR STERILIZING LACTEAL LIQUIDS

Charles E. Rogers, Detroit, Mich.

Application June 22, 1935, Serial No. 27,853

6 Claims. (Cl. 99—251)

This invention relates to apparatus for treating liquids containing bacteria and spores, the object being to provide a new and improved apparatus of such character that milk or cream for instance, or other liquid containing bacteria and spores, may be subjected to heat materially above the usual pasteurizing temperature of 185 degrees F. or less without detriment.

By my improved apparatus steam may be injected into the liquid while under pressure to secure the desired temperature and practically upon the attainment of the temperature immediately discharging the liquid into a vacuum chamber, I am able to destroy not only the bacteria but the spores contained therein and to discharge the volatile deleterious matter from the liquid under treatment to secure a product free from undesirable odors or flavors.

The principal feature of the invention involves a vacuum pan or chamber from which the condensible gases and vapors are discharged and means is also provided to prevent the liquid, which is in a mist like form in the chamber, from passing to the condenser outlet.

The invention further involves a means whereby the fluid is held from discharging to the vacuum chamber until a predeterminable pressure is attained in association with a steam inlet discharging into the fluid in a series of jet like streams whereby all particles of the fluid are subjected to the heat for a very short period of time approximately three seconds prior to release of the pressure and discharge into the vacuum chamber.

The general features of construction and process involved in my improved apparatus are disclosed in my pending application Serial No. 733,434, this invention differing therefrom in the structure of the mechanism for heating the fluid under pressure; in the structure of the receiver for the fluid discharging into the vacuum chamber, and in other details of construction hereinafter more fully described.

The preferred form of construction of an apparatus embodying my invention is shown in the accompanying drawings in which—

Fig. 1 is an elevation thereof, part of the vacuum chamber being broken away to show the interior construction.

Fig. 2 is an elevation taken from the right hand side of Fig. 1.

Fig. 3 is a plan view thereof.

Fig. 4 is a section through the liquid receiving apparatus within the vacuum chamber taken on line 4—4 of Fig. 1.

Fig. 5 is a longitudinal section through the pressure maintaining valve.

Fig. 6 is a detail of a portion of the steam supplying jet.

Fig. 7 is a longitudinal section showing an alternative form of the liquid receiving apparatus.

Fig. 8 is a cross section taken on line 8—8 of Fig. 7.

The apparatus consists essentially of the vacuum tank 1 in the upper end of which is a trough 2 extending diametrically across the vacuum chamber and this trough has outwardly extending downwardly inclined baffle plates 3, 3 on its opposite side walls as clearly shown in Fig. 1. Above this trough 2 and parallel therewith is a perforate pipe 4 having a series of apertures in its bottom side.

A valve controlled water supply line 5 is connected with the pipe 4, the arrangement providing that a spray of water is discharged into the trough. Gases and vapors rising to the top of the vacuum pan pass through this spray to enter the trough and pass to the outlet 6 at one side of the vacuum pan. To this outlet is connected the outlet conduit 7 leading to a vacuum pump 8 supported on a platform 9 secured between the legs 10, 10 which support the vacuum pan. The vacuum pump 8 discharges through a pipe 11 to atmosphere. The platform 9 is provided with adjustable feet 12 whereby it may be supported in a level position. The vacuum pump 8 is operated by a motor indicated at 13. The plates 3 supported in the trough 2 in the construction here shown, serve as baffles and the outer edges are curved to conform generally to the shape of the cylindrical form of the vacuum pan and are spaced therefrom providing a passageway 14 through which the gases and vapors may rise to the top of the pan and thence pass in through the condensing spray to the outlet. Thus any of the liquid, in the mist like form which it has on discharge into the receiver, rising in the vacuum pan collects on the plates and falls back to the bottom of the vacuum pan and thus any material loss of liquid under treatment through the condenser is prevented. The invention, however, is not restricted to the specific form of condenser here shown. Any approved form of condenser may be utilized without departing from the spirit of this invention but baffles should be provided for the purpose above mentioned.

Adjacent the bottom of the pan is what I have termed the "receiver" indicated generally at 15. This receiver is preferably in the form of a sheet metal tube 16 having perforations 17 over a portion of its bottom side and a series of similar perforations 18 over a portion of its upper side. The supplied fluid is discharged into one end of the receiver through the conduit 19 and as will be hereinafter understood, fluid discharging into the vacuum pan is at a high heat and is forced through the conduit by a pump and at considerable velocity due to the necessity of not maintaining the liquid at high temperature for a time period resulting in a detrimental chemical physical change. With the maintenance in the neighborhood of a twenty-eight inch vacuum in the vacuum pan 1, the fluid on entering the cylinder 17 practically explodes, as the temperature of the vacuum chamber is about 130 degrees F. and will discharge into the chamber proper from the receiver tube 16 through apertures 17 and 18. That fluid passing through the apertures 17 tends to move downwardly to the bottom of the vacuum pan and passes from the pan through the outlet pipe 20. The liquid particles in the comminuted form passing upward through the apertures 18 are prevented from passing directly upward in the vacuum pan by an imperforate shield 21 of arcuate form supported on the tube 16 by brackets 22. This tube at its opposite ends has a plate 22' to prevent the vapors passing endwise out of the hood and causing the same to pass downwardly of the curved surface of the shield 21 toward the bottom of the vacuum pan to the outlet.

The receiver structure which comprises one of the features of the invention tends to cause the liquid particles which are in mist-like form in the receiver, condense and fall to the bottom of the vacuum pan while the non-condensible gases pass to the condenser. Any of the floating particles of the liquid passing toward the top of the pan with the vapors and gases accumulate on the baffles and under surface of the condenser and drop to the bottom of the pan.

The apparatus for heating the fluid and maintaining it under pressure is shown more clearly in Figs. 1, 5 and 6. In Fig. 1 is shown a pump 24 having a liquid inlet 25 connected with a source of supply and operated by a motor 26 which, as shown in Fig. 3, is at one side of the center line of the shaft 27 connecting with the pump and its shaft is connected with the motor by a gearing in the box 28. The fluid is discharged from the pump 24 through a conduit 29 to a header 30. In this header is a pipe 31 having a series of inclined apertures 32 shown in Fig. 6 and a steam inlet (not shown) is connected with the end of the pipe in the header 30. The steam flows in the direction shown by the arrow in Fig. 1 into the conduit 31 and the fluid under treatment flows on the exterior of this pipe 31. The steam in jet form is injected into the liquid body through the jets 32. The steam pipe 31 is in a conduit 33 to which is connected by a T coupling 34, a conduit 35. This conduit 35 has a fitting 36 to which a conduit 37 is connected and the conduit 37 discharges through the outlet 19 into the receiver as will be understood from Fig. 3.

The T coupling 34 has a plug 38 removal of which permits the cleaning of the pipe 33. The distance from the point of the inlet of the milk or fluid under treatment in the fitting 30 to the point at which the pipe 19 discharges into the vacuum chamber is such that, considering the speed of movement of the milk or fluid which is under approximately sixty pounds pressure to secure the temperature, is even less than three seconds of time. This momentary heating of the milk to this high point has been found to be non-detrimental to the liquid being treated and such length of time, approximately three seconds, at a temperature of 300 degrees is sufficient to destroy practically all the spores in the liquid. In order that the pressure can be regulated and the temperature varied as may be desirable, I provide a pressure regulating valve 39 in what I have heretofore termed the fitting 36. This valve is shown in detail in Fig. 5. It will there be seen that the conduit 35 has a threaded connection with the portion 40 of the fitting 36 as by the ring coupling 41 shown in Fig. 2. This portion 40 at its inner end opening to the body of the fitting 36 has a seat for a valve 42 which is pivotally attached to the end of the valve stem 43 to insure seating. The stem extends outwardly into a cage 44. A coupling ring 45 is provided for holding the cage in place against the open end of the body 36.

Within this cage 44 is a packing gland 46 which may be of any approved type to prevent leakage and a disk 47 is seated on the stem 43 to receive one end of the compression spring 48, the opposite end being supported by a disk 49 which is engaged by a threaded sleeve 50 extending through the outer end of the cage and engages the disk 49. This sleeve 50 has a hand wheel 51 for operation thereof to vary the pressure of the spring and the stem extends outwardly through this sleeve 50 and wheel 51.

The valve 42 closes the conduit 35 and hence the conduit 33 and the fluid as hereinafter shown is discharged into the pipe 33 by the pump 24 about the jet head 31 and the pressure developed in the pipe 33 and 35 determines the temperature which is maintained until the liquid is discharged from the pipe 37 through the outlet 19. The fluid, as heretofore stated, discharges into the receiver tube 16 and, due to the temperature within the vacuum pan, the fluid at 300 degrees F., or other desired temperature, entering the same drops to 130 degrees F., and pressure is released whereby the fluid is broken into very minute particles not only destroying the bacteria and spores but freeing the fluid of any deleterious odors and flavors which pass out through the condenser while the liquid falls to the bottom of the tank and discharges through the outlet pipe 20. To this pipe 20 is connected a pump 52 having a yoke 53 which is shown in end elevation in Fig. 2. The outlet pipe 20 extends into a T 54 and the pipe continues therefrom through another fitting to the inlet pipe 55 of the pump.

This pump is of the ordinary well known commercial form having the vacuum chamber 56 thereabove discharging through the outlet line 57. This type of pump is required due to necessity of withdrawing the fluid against the influence of the vacuum pan or chamber. Preferably there is a check valve 58 just above the dome or chamber 56 to prevent back flow from the outlet line. The pump 52 is operated by the motor 26 which also operates the pump 24, there being a housing 59 between the motor 26 and the pump 52 for the apparatus actuating the pump 52.

In Fig. 7 an alternative form of receiver structure is shown. In the device shown at 16 in Fig. 4 the fluid is discharged into one end of the receiver. In order that the discharge of the liquid under pressure may be more uniformly distributed in the receiver, I provide a tube 60 having a head 61 at one end and a similar head 62 at the opposite end. The wall 100 of the chamber has a fitting 65 passing therethrough and threaded at its opposite ends, the outer end to receive the conduit 19 of Fig. 1 and the inner end being adapted to receive the coupling 66 for fastening the discharge tube 63 thereto. The tube 63 at its opposite end is supported on a lug 64 carried by the head 52. There are a series of slots 63' in the upper side of the tube 63 and fluid discharging through the tube 63 passes upwardly toward the imperforate side of the tube 60 and finds its way into the vacuum chamber through the apertures 60'.

In order that the tube 63 and the receiver tube 60 will be properly positioned with the apertures of the said tubes in the relationship shown in Fig. 8, the end wall of the tube 60 is notched as at 90 at its opposite ends and the cover members 61 and 62 are similarly notched so that, on assembly of the heads and the tube, the parts will be properly located. In order to sustain the receiver in position the wall of the vacuum chamber has an eye 69 to receive an L shaped hook element 68 on the head 62 thus arranging for ready disassembly of the parts when desired. The heads 61 and 62 may also be removed from the tube 60. With this form of receiver I am able to dispense with the shield 21 utilized with the form of receiver shown in Fig. 4.

From the foregoing description the operation of the apparatus will be readily understood. The milk or other fluid from any source feeds into the pump 24 through the inlet 25 and this is discharged under pressure into the pipe 33 and circumferentially envelops the jet head 31 to which steam is supplied from any desirable source and, due to the pressure maintained by the control valve 39, the temperature of the fluid is raised to approximately 300 degrees and is discharged at such temperature through the conduit 19 into the receiver wherein the volatile matter, gases etc., are discharged from the liquid. These gases discharge out through the condenser as heretofore stated and the liquid falls to the bottom of the vacuum pan 1 and is preferably withdrawn practically as rapidly as it is discharged into the vacuum chamber. It is not particularly necessary that the fluid be withdrawn so rapidly as above stated as the apparatus is useful in treating the various liquids containing spores or bacteria and many fluids to be treated such as a liquefied butter may remain for some period in the vacuum chamber while fresh cream for instance should be withdrawn more quickly.

Cream so treated, if it is held in the vacuum for too long a period, would be productive of what is known as "short grained" butter of tallow like consistency but by withdrawing it within a few seconds of time from the time of entrance into the vacuum pan such change in the characteristics of the fluid is prevented. Incidentally it is to be noted that the vacuum pan 1 has a manhole 70 through which the receiver may be introduced and into which a person may enter the chamber for cleaning purposes.

Without the shield 21 for the receiver a material loss of the liquid under treatment would be occasioned by its rising to and passing into the condenser at the top of the vacuum pan but by the use of this shield and by the baffles 3, material loss of the liquid is prevented.

It is to be understood that various changes in structure and arrangement of the parts may be made without departing from the spirit and scope of this invention.

Having thus fully described my invention, its utility and mode of operation, what I claim and desire to secure by Letters Patent of the United States is:—

1. Apparatus for sterilizing lacteal liquids containing bacteria and spores comprising a vacuum chamber having an exhaust outlet, a conduit opening to the chamber, means for discharging liquid into the conduit, means for discharging steam into the liquid in the conduit, means for maintaining the steam and liquid under a predetermined pressure in a portion of the conduit to maintain a temperature therein of approximately 300 degrees F., the speed of movement of the liquid in the conduit and the length of said conduit portion limiting the heating period of the moving liquid, said conduit having a part receiving the liquid from said first named portion, a receiver in the vacuum chamber into which the heated liquid is discharged from said last named portion of the conduit and wherein the liquid is broken up into a fog-like state due to influence of the vacuum in reducing the pressure and extracting the heat, there being openings in the bottom wall of the receiver through which the comminuted liquid particles and gases may pass toward the bottom of the chamber and the exhaust outlet of the vacuum chamber being above the receiver, a baffle in the vacuum chamber above the receiver for intercepting liquid particles tending to rise with the gases in passing to the outlet, a discharge conduit opening to the bottom of the vacuum chamber, and a pump for withdrawing liquid from the chamber through said discharge conduit.

2. Apparatus for sterilizing lacteal liquids comprising a vacuum chamber, a conduit opening to the chamber, a pump discharging liquid into the conduit, valve means in the conduit adjacent the chamber for maintaining the liquid under predetermined pressure, means for injecting steam into the liquid as it enters the conduit, the said valve controlling the pressure providing a means whereby the temperature to which the liquid is heated may be predetermined prior to discharge into the chamber, and a receiver in the vacuum chamber above the possible liquid level therein and into which the liquid is discharged to influence of the vacuum thereby providing means for separation of the gases from the liquid particles prior to discharge thereof into the vacuum chamber proper.

3. In apparatus for sterilization of liquids containing bacteria and spores, a vacuum chamber having an outlet at the top, a vacuum producing means connected with the outlet, means for discharging the liquid into the chamber under high temperature and pressure, a receiver in the vacuum chamber spaced from the bottom thereof above the normal liquid level therein, said receiver being subject to influence of the vacuum and the material under heat and pressure being discharged directly into the receiver, said receiver comprising a chamber having apertures in the bottom side thereof through which the material may pass into the vacuum chamber, a chilled baffle plate below the top preventing direct movement of the material to the outlet, and means for withdrawing liquid collecting in the bottom of the chamber.

4. In apparatus for sterilization of liquids containing bacteria and spores, a vacuum chamber having an outlet at the top, a vacuum producing means connected with the outlet, means for discharging the liquid into the chamber including a conduit in a portion of which the liquid is subjected to temperature approximating 300 degrees F. and pressure of 100 pounds per square inch and a portion leading therefrom to the vacuum chamber, a receiver in the vacuum chamber spaced from the bottom thereof above the normal liquid level therein and into which the last named portion of the conduit charges, said receiver and end of the conduit opening thereto being subject to influence of the vacuum and the material under heat and pressure being discharged directly into the receiver, said receiver comprising a chamber having apertures in the bottom side thereof through which the material may pass into the vacuum chamber, and means for withdrawing liquid collecting in the bottom of the chamber.

5. Apparatus for sterilizing lacteal liquids comprising a vacuum chamber, a conduit for discharging liquid thereinto, said conduit having a heating section and a section extending therefrom and discharging to the vacuum chamber, a valve for holding the liquid under pressure in the first section, means for introducing steam into a flowing liquid body in the first section, the valve providing a pressure control means whereby the liquid in the first sectional conduit may be held at predetermined pressure to secure a predetermined temperature prior to discharge to the second section, a receiver comprising a chambered member in the vacuum chamber and having openings in the bottom wall thereof above the possible liquid level in the vacuum chamber whereby liquid discharging into the said chambered element is subject to influence of the vacuum of the vacuum chamber and is broken up into a fog-like state therein due to the instantaneous drop in pressure and loss of heat by influence of the vacuum.

6. In apparatus for sterilization of liquids containing bacteria and spores, a vacuum chamber having an outlet at the top, a vacuum producing means connected with the outlet, a conduit for discharging liquid to the chamber and means for supplying liquid under pressure to the conduit, said conduit having a portion wherein the liquid is subjected to a temperature of approximately 300 degrees F. and a pressure of approximately 100 pounds per square inch and a portion leading therefrom to the vacuum chamber, a receiver in the vacuum chamber positioned above the normal level of the liquid therein and to which the said last named conduit portion opens, the receiver and end of the conduit therein being subject to influence of the vacuum and the receiver having openings through which the material discharged thereto may pass into the vacuum chamber proper, and means for withdrawing liquid collecting in the bottom of the vacuum chamber.

CHARLES E. ROGERS.